Jan. 23, 1962 W. J. ORLIN 3,017,769
HYDRAULICALLY SIMULATED WIND TUNNEL
Filed Nov. 14, 1956 3 Sheets-Sheet 1
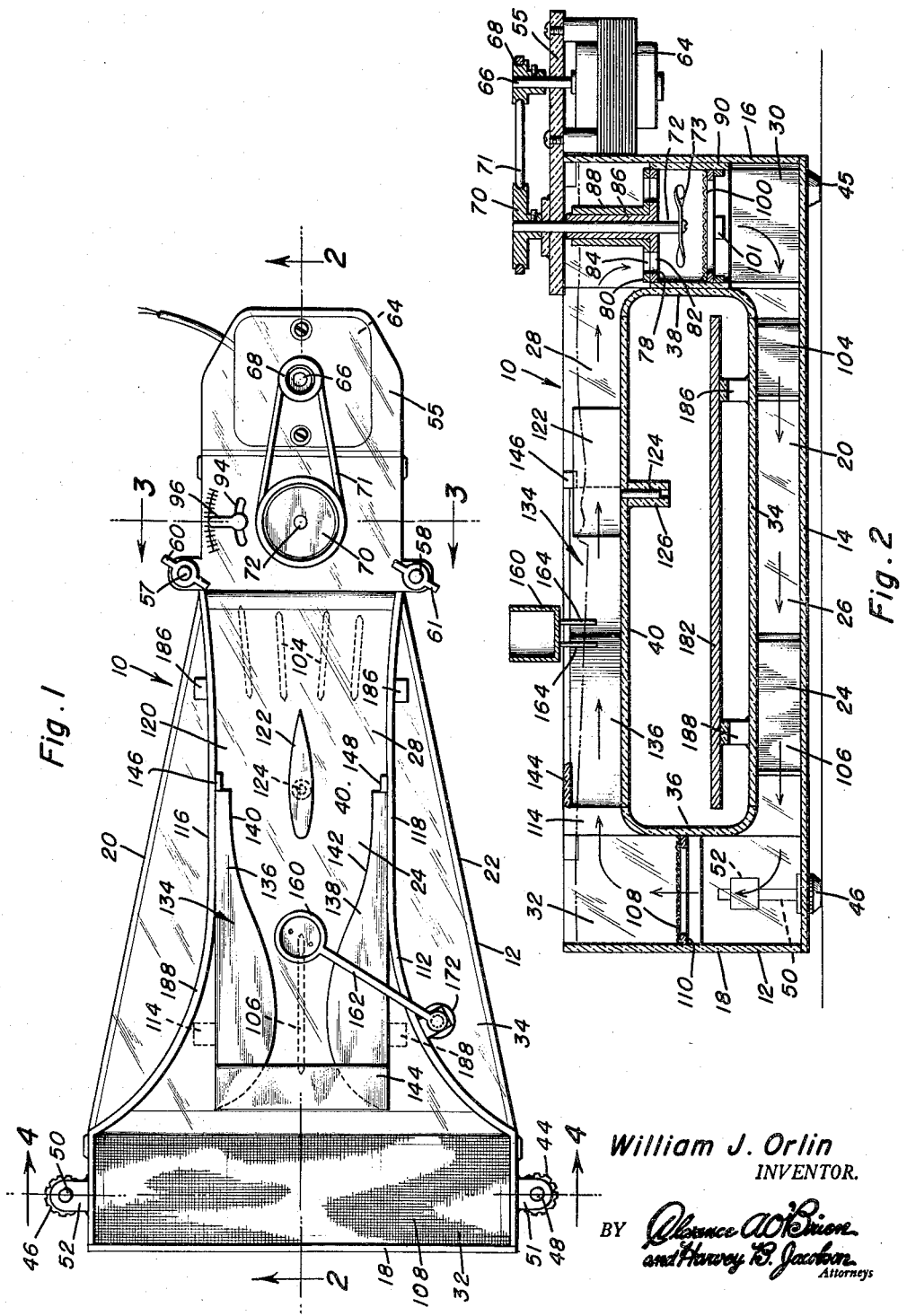
William J. Orlin
INVENTOR.

Jan. 23, 1962　　W. J. ORLIN　　3,017,769
HYDRAULICALLY SIMULATED WIND TUNNEL
Filed Nov. 14, 1956　　3 Sheets-Sheet 2
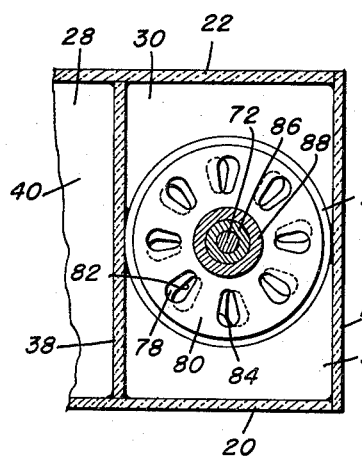
Fig. 5
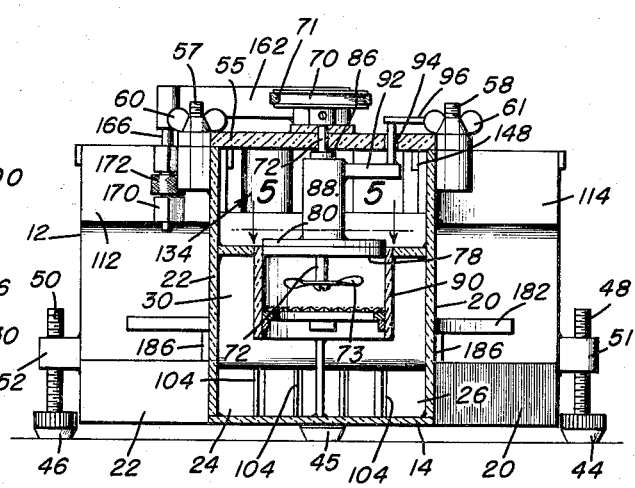
Fig. 3
Fig. 4
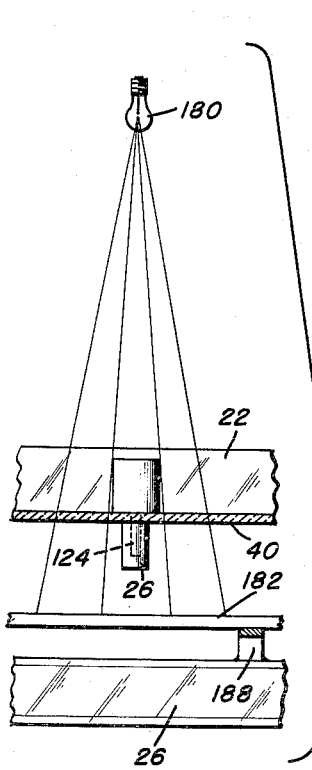
Fig. 6
William J. Orlin
INVENTOR.

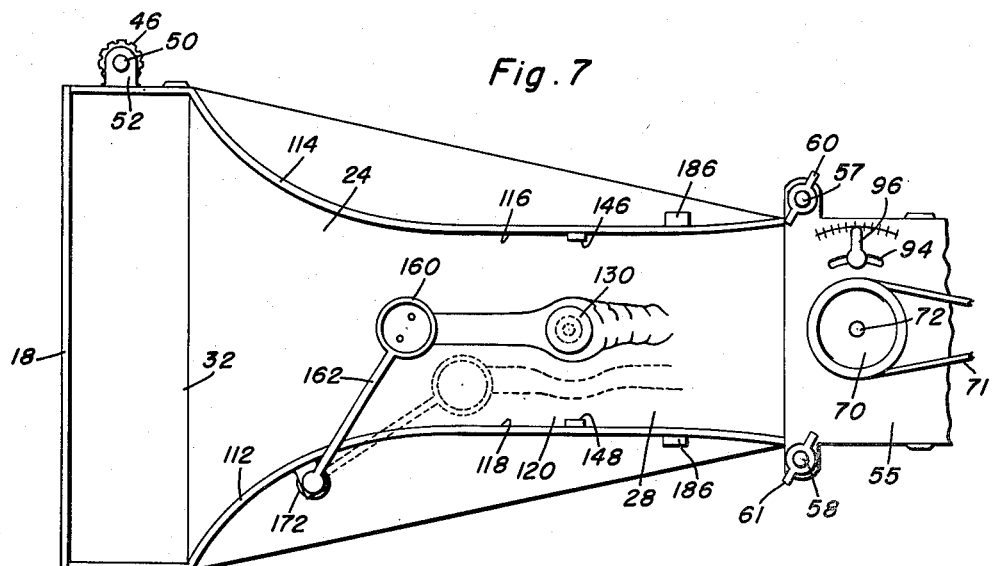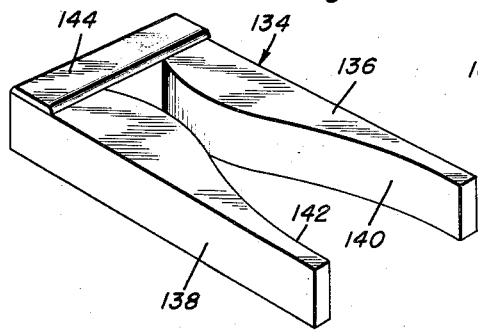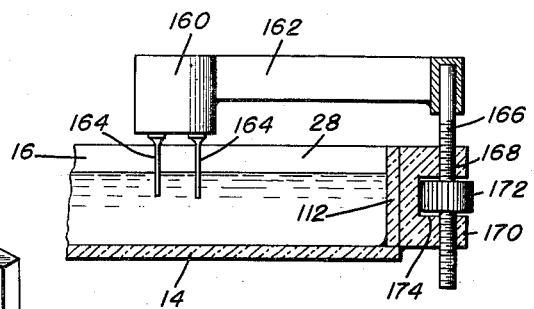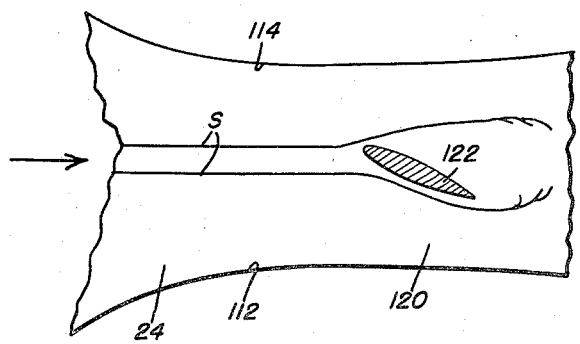

United States Patent Office 3,017,769
Patented Jan. 23, 1962

3,017,769
HYDRAULICALLY SIMULATED WIND TUNNEL
William J. Orlin, Monteagle, Tenn., assignor to Amrad, Inc., Sewanee, Tenn., a corporation of Tennessee
Filed Nov. 14, 1956, Ser. No. 622,076
6 Claims. (Cl. 73—147)

This invention relates to a device for simulating a wind tunnel in appearance and operation and is useful as laboratory equipment, a toy and for other purposes.

The gradual development of aircraft has brought about increasing speeds of such craft relative to the surrounding air. In many cases this speed exceeds the speed of sound and the air flow over the airplane surface undergoes a marked change in flow properties. Shock waves appear in the flow and where they intersect the airplane surfaces have a strong tendency to cause the flow to separate from those surfaces. These extremely complicated phenomena are of prime importance in high speed aircraft and guided missile design and are experimentally studied in wind tunnels. Accordingly, an object of the present invention is to provide an inexpensive, practical device to study these phenomena, the device relying on the mathematical analogy between water flow with a free surface and two-dimensional air flow.

A further object of this invention is to provide an hydraulically simulated wind tunnel which is arranged to faithfully reproduce the essential components of a high speed wind tunnel circuit and has provision for circulation of liquid in such manner that virtually all of the air flow properties at both low and high speeds (subsonic and supersonic) may be vividly portrayed.

As a result of the development of the invention there is a portable device which is an extremely useful adjunct to general aeronautical education and qualitative aerodynamic development inasmuch as it permits direct and prolonged observation of such complicated phenomena as shock wave formation and interaction, interference effects and flow instability. This is more pronounced than in the actual full scale wind tunnel that is to be simulated by the invention. Unlike the smoke tunnel, which can only demonstrate very low speed phenomena, the invention in its practice, is capable of reproducing the important flow properties at all speeds and these include vortices and turbulence, separation, streamlines, pressure distributions and shock waves. Streamlines and shock waves may be easily photographed or projected on a vision screen while pressure distributions are dynamically visualized by direct observation of the water surface.

A further object of the present invention is to provide a device simulating a wind tunnel in its operation and results, but relying on the hydraulic analogy mentioned previously, the device including a closed circuit passageway having one duct open to provide a free surface, another duct which is preferably arranged approximately parallel thereto and connecting chambers at the ends of the ducts, one chamber being utilized as a stilling chamber and provided with at least one quieting screen and the other chamber being used as a propulsion chamber for the liquid and accommodating a liquid impeller together with a liquid throttle of the adjustable type and optionally, a quieting screen, this screen being in advance of the lowermost duct which is shaped to provide a subsonic diffusion of the liquid in the passageway. A device of this nature may be made compact, reasonably small and portable and yet capable of operation in the transonic and supersonic regions.

A further object of the invention is to provide a simulated wind tunnel as above wherein the passageway has a test section and an upstream nozzle formed by walls of the passageway, this nozzle being a basic subsonic nozzle capable of accepting one or more inserts to change the character of the nozzle, the principal change being from a basic subsonic nozzle to a supersonic nozzle, although variations in the nozzle configuration for special purposes are contemplated.

One of the features of the invention is in the manner which some of the results are observed. More particularly, it is preferred that a viewing screen be located in opposition to the test section for visual inspection of flow phenomena. Virtually all of the important compressible air flow phenomena may be qualitatively demonstrated by the simulated wind tunnel. Flow analysis may be obtained from shadowgraphs and streamline visualization which will utilize the light reflecting screen or other surface of a similar character. In addition direct observation of free surface depth levels is possible. Shadowgraphs of the free liquid surface are directly comparable to shadowgraphs obtained in two-dimensional air flow. In air, the changes in illumination on a screen are proportional to the second derivative of the density of the flow. In the free surface liquid flow utilized in the simulated wind tunnel, fluid depth is analogous to density, and surface curvature causes illumination changes when a source of illumination is arranged to be passed through the test section and viewed on a reflecting surface. Flow discontinuity such as shock waves and vortices are made visible by this method. Streamline visualization is accomplished by injecting streamers of dye upstream of the model and observing the pattern distortion around the model. Direct observation of free surface depth permits qualitative evaluation of the analogous pressure, density, and temperature fields in the gas flow since the fluid depth corresponds directly to the gas temperature and density, and the square root of the gas pressure.

Other objects will become apparent in following the description of the embodiment of the invention which is illustrated in the accompanying drawings, wherein:

FIGURE 1 is a plan view of a simulated wind tunnel which is constructed in a manner to demonstrate the principles of the invention;

FIGURE 2 is a longitudinal sectional view taken on the line 2—2 of FIGURE 1;

FIGURE 3 is a transverse sectional view showing principally the liquid impeller, liquid impeller chamber and associated structure and taken approximately on the line 3—3 of FIGURE 1;

FIGURE 4 is an enlarged sectional view of the quieting chamber part of the simulated wind tunnel and taken approximately on the line 4—4 of FIGURE 1;

FIGURE 5 is an enlarged fragmentary sectional view showing the throttle for the liquid passing through the passageway of the simulated wind tunnel;

FIGURE 6 is a schematic, exploded representation of a light source directing its rays through the test section of the wind tunnel and onto a light reflecting surface from which test results may be observed;

FIGURE 7 is a fragmentary top view of the simulated wind tunnel in subsonic use, the test model being a cylinder, this view showing in dotted line a second position of the means to introduce dye into the liquid flow;

FIGURE 8 is an enlarged sectional view showing the adjustable mounting means for the dye applying pens of FIGURE 7;

FIGURE 9 is a perspective view of the convergent-divergent supersonic nozzle that is adapted to be separably mounted in the basic subsonic nozzle of the simulated wind tunnel flow passageway; and FIGURE 10 is a schematic view showing a low speed airfoil in the test section of the simulated wind tunnel, the simulated wind tunnel operating at such Mach number as to cause the flow to detach from the upper surface of the airfoil at the stalled condition.

In the accompanying drawings there is a simulated wind tunnel 10 which is constructed to take advantage of the hydraulic analogy in which free surface liquid flow over a horizontal surface is mathematically comparable to two-dimensional compressible gas flow. Simulated wind tunnel 10 consists of a tank 12, having a bottom wall 14, end walls 16 and 18 and side walls 20 and 22. This is the general organization of the tank with these walls and others being arranged to form a liquid passageway 24. The passageway forms a closed circuit for the flow of liquid, preferably, but not necessarily, water. Passageway 24 consists of a lower duct 26, an upper parallel duct 28, and chambers 30 and 32 at the ends of the ducts interconnecting the upper and lower ducts. Duct 26 is made from the bottom wall 14 of tank 12, short parts of sides 20 and 22 and an upper wall 34 connected to the short side walls and the two and inner end walls 36 and 38, the latter having an upper wall 40 connected thereto and constituting the bottom of the upper duct 28. Stilling chamber 32 is made from the end walls 18 and 36, the end taller parts of side walls 20 and 22 and a part of the bottom wall 14. The impeller and throttle chamber 30 is made from end walls 16 and 32, together with taller parts of side walls 20 and 22, and a part of the bottom wall 14 of the tank. Finally, the upper duct 28 has an open top and is made from the wall 40 and upper short parts of side walls 20 and 22, the ends of the upper duct 28 being in communication with the two chambers 30 and 32.

Tank 12 is supported on three or more legs having feet 44, 45 and 46 respectively. Each of the legs is constructed identically, for example (FIGURE 4) feet 44 and 46 having threaded shanks 48 and 50 respectively connected therewith and passed through threaded bores in mounting brackets 51 and 52. These mounting brackets are fixed to the tank, for example, connected integrally with, cemented on or otherwise joined to the side walls 20 and 22. By virtue of the adjustments of the legs the simulated wind tunnel may be made horizontal prior to using it.

There are means in the impeller and throttle chamber 30 for pumping the liquid through the passageway 24. These means are made of a mounting plate 55 connected to the side walls 20 and 22 of chamber 30. The connection may be made by placing a part of the plate 55 over chamber 30 and bolting it down, as by bolts 57 and 58 passing through holes in the plate 55 and drawn into tightening engagement by wing nuts 60 and 61. Another part of mounting plate 55 is cantilevered beyond the end wall 16 and supports an electric motor 64 whose shaft 66 passes through an aperture therein. A pulley 68 is secured to motor shaft 66 and is used to drive the pulley 70 through a belt 71 which is entrained around both of these pulleys. Although the belt and pulley is a simple type of motion transmitting mechanism others may be adopted, such as a direct drive, chain drive, gear drive, etc. Pulley 70 is on one end of shaft 72, the other end having blade 73 thereon. This forms a liquid impeller or pump which imparts motion to the liquid in the passageway 24.

A liquid throttle is in the chamber 30 and consists of two plates 78 and 80 in contact with each other. Plate 78 has a plurality of holes 82 while plate 80 has a similar group of holes 84 that are adapted to be registered with the holes 82 upon relative rotation between the plates. Hence the effective area of the hole pattern is controllable thereby forming a throttle for the liquid as it flows therethrough. Concentric sleeves 86 and 88 respectively are mounted around shaft 72 with sleeve 86 being fixed to plate 78 and sleeve 88 being fixed to plate 80. The plate 78 is secured to an annulus 90, and this fixed in the chamber 30 by being secured to end walls 16 and 38. Sleeve 88 is rotatable with respect to sleeve 86 and has an adjusting arm (FIGURE 3) 92 fixed thereto and protruding laterally therefrom. This arm is right angular in configuration and has a part which passes through slot 94 in the mounting plate 55. Finger grip 96 is secured to the outer end of arm 92 and is used to adjust the sleeve 86 and thereby adjust the throttle. Calibrations may be provided on the plate 55 for coaction with the finger grip 96 and these calibrations may be at any units, for example Mach number.

As the liquid is propelled through the passageway 24 by the liquid impeller, it must pass througn a quieting screen 100 which is mounted on blocks 101 or otherwise attached in the annulus 90. After leaving the chamber 30 the liquid passes between a group of flow straightening vanes 104 that are attached to the upper and lower walls 34 and 14 respectively of duct 26 and at the inlet part of this duct. When viewing the duct from the inlet part, that is the part which joins chamber 30, and progressing toward chamber 32, from above the duct diverges in order to form a two-dimensional diffuser. One or more additional flow straightening vanes 106 may be mounted in the duct 26 in advance of the chamber 32. The stilling chamber 32 receives the liquid after it has been straightened and a considerable quantity of the turbulence and swirl produced in the impeller chamber, has been removed. Upon entering the stilling chamber 32 the velocity of the liquid has been reduced due to the diffuser function of duct 26, and the liquid passes through a quieting screen 108 that is mounted at approximately the center of the chamber 32. Screen 108 is connected to a frame 110 and the frame is secured onto the side walls of chamber 32. After passing through quieting screen 108 the liquid has little or no turbulence and vorticity.

Duct 28 is defined by the wall 40 and the upper parts of side walls 22 and 24 whose surfaces 112 and 114 are arranged as a basic subsonic nozzle that is, a convergent nozzle wherein the velocity of the liquid is gradually increased until the flow reaches the region of the parallel or approximately parallel wall surfaces 116 and 118. This part of the duct is the test section 120 wherein there are means to support a model. As shown in FIGURES 1 and 2 model 122 is in the form of an airfoil, although any other standard or unusual or new configuration may be tested. A pin 124 is fixed to the model 122, this pin being fitted in a socket 126 that is secured to the wall 40 of duct 28 and that is in registry with an aperture in this wall. Although a pin mount is shown for the model 122 it is appreciated that other types of mounts may be adopted, for example a slide model holder. Among the numerous shapes of models and types of models that may be tested in the test section 120, are cylinders 130 (FIGURE 7), dams and weirs, orifices, boat hulls and other marine products, engine cowlings, missile shapes, jet engine inlet diffusers and many others as will occur to men skilled in this field.

For transonic and supersonic work the nozzle in the duct 28 is changed by the application of an insert. One of the most common inserts which is used is the nozzle 134 (FIGURE 9), this being of the convergent-divergent type. The nozzle insert 134 comprises two blocks 136 and 138 whose confronting surfaces 140 and 142 are configured to form a convergent-divergent nozzle. The blocks are connected together by transverse brace 144 that is secured to the top surfaces of the blocks and at the inlet of the nozzle. The outer sides of the blocks are adapted to fit against the surfaces 116 and 118 near the test section while the entire insert 134 is placed upon the upper surface of the bottom of the duct 28. Small stops 146 and 148 are mounted in the test section and are contacted by the discharge end of the nozzle insert 134 to hold the nozzle insert secure while the simulated wind tunnel is in supersonic test use.

Means for introducing streamers of a coloring material, for example dye in liquid or granulated solid form, ink, etc. are mounted operatively on the tank. These means consist of a receptacle 160 mounted on an arm 162, the latter enabling the receptacle to swing over the open top of the passageway duct 28 and in any one of a wide range of positions with respect thereto. Receptacle 160 is adapted to hold a quantity of dye or like material, and there are one or more needles 164 connected to the receptacle 160 and movable into the flow of liquid passing through the passageway in advance of the test section 120. Needles 164 are of the medical supply type having passages extending therethrough, these passages being in registry with the interior of receptacle 160 to receive dye and discharge it into the flow of water therebelow. Arm 162 is mounted on a threaded spindle 166, the spindle passing through the bore 168 of a mounting block 170. Adjustment nut 172 is on the threaded shank of a spindle 166 and located in a recess 174 that is formed in the block 170 and specifically, between the ends of bore 168. By adjustment of the nut 172 the elevation of the arm 162 and hence, the point of application of the dye may be obtained. Moreover, this construction permits the location of the receptacle 160 in a horizontal plane to be altered, there being sufficient friction between the parts to hold the position when selected.

Direct observation of streamlines is possible by the use of the injection of streams of dye or other coloring material upstream of the test model and into the flowing liquid. However, additional test information is obtained by a surface refraction projection system that is schematically illustrated in FIGURE 6. This system includes a source 180 of light arranged so that the rays thereof are directed so as to pass through the test section 120. Differences in density of two-dimensional air flow find a counterpart in differences of height of the flowing liquid through the test section and these density differences of the liquid are observable as shadows on a light reflecting screen 182. This screen has its reflecting surface opposed to the wall 40 of duct 28, and at least wall 40 of the simulated wind tunnel is made of transparent material. The screen 182 is located in the cavity between the upper and lower ducts 28 and 26 of the simulated wind tunnel and is mounted on supports 186 and 188 carried by the top wall 34 of duct 26. It is understood that the various densities of two-dimensional flow air in an ordinary wind tunnel find their analogy in water depths in the test section and the curvature of the water surface having light passing therethrough due to a refraction phenomenon, causes shadows whose intensity will vary in accordance with comparable two dimensional compressible gas flows. The shadows will vary from a very light grey to a dark grey.

The preceding is the description of an embodiment of a simulated wind tunnel utilizing the hydraulic analogy which was referred to herein previously. It is to be understood that many variations may be made from this embodiment of the invention which exemplifies the principles thereof. Some variations and modifications have been referred to and others, such as a change in the type of liquid throttle or liquid impeller are obvious. Moreover, the illustrated form of the invention is made essentially of a transparent plastic such as an acrylic resin known under the trade name "Plexiglass" or other plastic that has desirable properties and characteristics of light transmission, strength, etc.

In operation motor 64 is energized thereby actuating the liquid impeller and propelling the water through the straightening vanes 104, the lower, diffusing duct and into the stilling chamber and screen to eliminate any flow disturbances. The water then flows smoothly through a subsonic nozzle where the velocity gradually increases until the region of the test section 120 is reached. The model under study (FIGURE 10) is placed in the test section. After flowing around the model water is discharged into the flow receiving chamber and picked up by the pump for recirculation through the same circuit.

Additional flow straightening devices may be used where found necessary, for example the screen 100 in chamber 30. This screen coacts with the vanes 104 to remove the swirl introduced by the impeller and reduce turbulence and vorticity in the stream.

There are two ways of studying the flow. The first is by observing the liquid surface in upper duct 28 directly and second is by projection of surface disturbances on a viewing surface which may be screen 182 or some other surface, for example, a reflecting surface applied on the bottom 40 of the upper duct 28. Direct observation of the free surface level permits visualization of the pressure variations around the test object. Streamlines are obtained as described previously that is, by the introduction of water soluble dye, ink or the like at a point upstream of the model. On the other hand, shock waves and vorticity are best observed by placing a light above the upper duct 28 and casting shadows on the viewing surface.

FIGURE 10 shows a graphic portrayal of the stalled condition about a light airplane wing section. This is best observed by direct visualization of the surface of liquid in duct 28. The streamlines clearly indicate leading edge stall on the upper surface and attached flow at the lower surface of the test model 122. This, of course, is what is observed in the more fugitive smoke patterns in a smoke tunnel. FIGURE 7 has a different model 130 which is a cylinder. This figure shows a low speed streamline pattern and the streamlines demonstrate the low Reynolds number laminar separation which occurs approximately 80° from the forward stagnation position. The streamline generator 160 may be adjusted to any location upstream of the model 130 as shown in the dotted line position thereby permitting visualization of the entire flow field. In connection with the illustration of FIGURE 7, when the Reynolds number is increased somewhat toward the critical value an unstable condition is set up behind the cylinder in which vortices are shed alternately from each side and, as the critical Mach number is exceeded (M equals .43), an asymmetrical shock formation appears. This occurs because the velocity on each side of the cylinder alternately rises above and falls below the local speed of sound as the flow closes in and then breaks away from the surface. At still higher speeds (M equals 0.75) the flow becomes steady and finally closes in behind the cylinder forming a strong gull-shaped shock wave in the wake. The flow phenomena observable are for all practical purposes identical in an ordinary fullscale wind tunnel and are remarkably similar to shadowgraph pictures of corresponding flow in air.

In order to obtain supersonic flow simulation, the nozzle insert 134 is disposed in the duct 28, there being a group of inserts provided so as to correspond to an entire range of supersonic flow conditions. In the alternative, the contour of the confronting surfaces 140 and 142 may be adjustable so as to alter the shape and coefficient of the convergent-divergent nozzle. Shock waves, vorticity, pressure distributions, turbulence, streamlines, hydraulic jump, and other phenomena are then clearly observable in the manner described previously.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. Hydraulic analogy apparatus comprising, elongated frame means including an upper open channel portion and a lower closed return channel portion disposed parallel to each other and end, flow-quieting connecting passageways of larger cross-sectional dimension than the upper and lower channel portions interconnecting said channel portions, variable orifice means mounted in one of said passageways, impeller means disposed within said one passageway below the orifice means, drive means supported by the frame means drivingly connected to said impeller means and control means operatively connected to said variable orifice means and movable with respect to calibrated flow scale means on the frame means to position the variable orifice means.

2. Hydraulic analogy apparatus for comparing two-dimensional compressible gas flow with liquid flow having a free surface, comprising horizontally disposed open channel flow means, closed return channel flow means disposed in vertically spaced relation to said open channel means, flow quieting passage means operatively interconnecting said open and enclosed channel means and variable, gas-flow calibrated, liquid flow inducing means operatively disposed in said flow quieting passage means comprising variable orifice means disposed in said passage means, impeller means rotatably mounted by said orifice means within the passage means for impelling liquid through the orifice means and calibrated control means operatively connected to the orifice means for varying orifice size to produce liquid flow corresponding to flow characteristics of a compressible gas with which the liquid flow is being compared.

3. The combination of claim 2, including liquid dye injecting means adjustably mounted relative to an upstream portion of the open channel means for injecting streamline indicating liquid dye at various depths and spaced points along the open channel means.

4. The combination of claim 3, including visual liquid density variation indicating means comprising, light reflecting means mounted between said open and closed channel means and disposed parallel thereto, said open channel means including a transparent model testing portion and a source of illumination disposed above said testing portion of the open channel means for producing shadows of varying intensities in the liquid by reflections from the reflecting means disposed therebelow.

5. The combination of claim 4, including flow straightening means disposed in said closed channel means for reducing non-uniform flow of the liquid.

6. Hydraulic analogy apparatus comprising, elongated frame means including an upper open channel portion and a lower closed return channel portion disposed parallel to each other and end, flow-quieting connecting passageways of larger cross-sectional dimension than the upper and lower channel portions interconnecting said channel portions, leveling support means operatively connected to the frame means for positioning the channel portions horizontally, said upper channel portion having an upstream nozzle section for receiving nozzles of different configurations and flow velocity characteristics and a transparent testing section for adjustably positioning a test model therein, fixed orifice plate means axially mounted in one of said connecting passageways, variable orifice plate means rotatably mounted with respect to said fixed orifice plate means in said one passageway, impeller means disposed within said one passageway below the fixed orifice plate means and rotatably mounted by shaft means extending upwardly through said orifice plate means, drive means supported by a mounting plate on one end of the frame means, said drive means being drivingly connected to said shaft means, control means connected to said variable orifice plate means and movable with respect to calibrated flow scale means on the mounting plate to position the variable orifice plate means, flow straightening means mounted in the lower channel portion, and shadow producing reflector means mounted on the lower channel portion in spaced parallel relation below the upper open channel portion.

References Cited in the file of this patent

UNITED STATES PATENTS

| | | |
|---|---|---|
| 1,676,984 | Fales et al. | July 10, 1928 |
| 2,018,403 | Hussar | Oct. 22, 1935 |
| 2,317,550 | Ormond | Apr. 27, 1943 |
| 2,382,999 | Lee | Aug. 21, 1945 |
| 2,448,966 | Fales | Sept. 7, 1948 |
| 2,593,491 | Saunders et al. | Apr. 22, 1952 |

OTHER REFERENCES

Publication: Aeronautical Quarterly, vol. 2, 1951–52, pages 227–234. "Supersonic Flow Investigation With a Hydraulic Analogy Water Channel" by Black et al.

Publication: Agardograph #1 "Design and Operation of Wind Tunnels" by A. Ferri et al. N.A.T.O., 1954, pages 28, 29, 96.

NACA Technical Note 1185 (February 1947), Orlin et al., "Application of the Analogy Between Water Flow With a Free Surface and Two-Dimensional Compressible Gas Flow," pages 1–19 and FIGS. 3, 4, 5, 6 and 7.